United States Patent [19]

Sasaki et al.

[11] Patent Number: 5,045,584

[45] Date of Patent: Sep. 3, 1991

[54] POLISH CONTAINING SILICONE ELASTOMER PARTICLES

[75] Inventors: Atushi Sasaki; Asao Harashima; Keiji Yoshida, all of Chiba, Japan

[73] Assignee: Toray Silicone Company, Limited, Tokyo, Japan

[21] Appl. No.: 431,123

[22] Filed: Nov. 3, 1989

[30] Foreign Application Priority Data

Nov. 29, 1988 [JP] Japan ................... 63-301653

[51] Int. Cl.$^5$ .............................................. C08L 91/06
[52] U.S. Cl. .................................. 524/277; 524/487; 106/10
[58] Field of Search ................... 524/277, 487; 106/10

[56] References Cited

U.S. PATENT DOCUMENTS

| | | | |
|---|---|---|---|
| 2,839,482 | 6/1958 | Geen et al. | 524/277 |
| 3,857,720 | 12/1974 | Fellows | 524/277 |
| 4,113,677 | 9/1978 | Svedas et al. | 524/277 |
| 4,404,035 | 9/1983 | Ona et al. | 106/271 |
| 4,462,828 | 7/1984 | Otsuki | 106/3 |
| 4,729,794 | 3/1988 | Rosenburg | 106/191 |

FOREIGN PATENT DOCUMENTS 46-007568 2/1971 Japan .
55-062978 5/1980 Japan .
61-159474 7/1986 Japan .

*Primary Examiner*—Melvyn I. Marquis
*Assistant Examiner*—R. Dean, Jr.
*Attorney, Agent, or Firm*—Jim L. DeCesare

[57] ABSTRACT

A polish including a film forming wax material and an organopolysiloxane elastomer. The elastomer is in the form of particles mixed with the film forming wax. The particles are spherical and have an average diameter of from about 0.3 um to about 30 um. The polish contains at least one additive selected from the group consisting of organic solvents, silicone oils, and surfactants. The film forming wax material may be one of carnauba wax, montan wax, candelilla wax, ceresin wax, paraffin waxes, and beeswax.

9 Claims, No Drawings

POLISH CONTAINING SILICONE ELASTOMER PARTICLES

The present invention is directed to a polish. Polishes have been applied on the surfaces of leather goods, furniture, musical instruments, automotive bodies, for surface protection and for enhanced gloss. For such polishes, film-forming materials such as waxes and dimethyl polysiloxanes oils as gloss-imparting agents are employed. However, conventional polishes have poor applicability and wiping properties, and the surface gloss is not durable.

SUMMARY OF THE INVENTION

It is an object of the present invention to provide polishes with excellent applicability, wipeability, soil removal, and gloss retention The present invention concerns polishes comprising film-forming materials and organopolysiloxane elastomer particles.

DETAILED DESCRIPTION OF THE INVENTION

Film-forming materials commonly used in polishes are used in the present invention. Such film-forming materials may be waxes such as carnauba wax, montan wax, candellila wax, cerisin wax, and paraffins such as solid paraffins, liquid paraffins, and beeswax.

The organopolysiloxane elastomer particles used in the present invention are effective for providing good wipe workability, soil removal, and gloss retention. Such organopolysiloxane elastomer particles have an average diameter of 0.1-1000 μm, preferably 0.3 μm to 30 μm. Below 0.1 μm, the beneficial effects of organopolysiloxane elastomer are not realized, while above 1000 μm, a rough finish is obtained. Preferably, the particles should be spherical. The amount used varies depending on the type of polishes and is preferably 0.1-30 wt % for cream and emulsion polishes and 0.1-50% for solid or paste polishes. Below the lower limit, the effects of the organopolysiloxane elastomer particles are not realized, while with excessive organopolysiloxane elastomer particles, applicability becomes poor.

The organopolysiloxane elastomer constituting such particles may be obtained by curing addition reaction curable organopolysiloxane compositions comprising organopolysiloxanes containing silicon-bonded hydrogen, organopolysiloxanes containing silicon-bonded vinyl groups, and platinum catalyst as the main components; by curing condensation reaction curable organopolysiloxane compositions comprising organopolysiloxanes containing hydroxy groups at both chain ends, organopolysiloxanes having silicon-bonded hydrogen, and organotin compounds as main components; curing condensation reaction curable organopolysiloxane compositions comprising diorganopolysiloxanes terminated by hydroxy groups at both chain ends, hydrolyzable organosilanes, and organotin compounds or titanic acid esters as the main component; by curing organic peroxide curable organopolysiloxane compositions comprising organopolysiloxanes containing vinyl groups and organic peroxides as main components; or curing high-energy curable organopolysiloxane compositions by irradiating with J-rays or UV rays. Preferred are the addition reaction curable organopolysiloxane compositions and the condensation reaction curable organopolysiloxane compositions.

The organopolysiloxane elastomer particles used in the present invention can be prepared by many different methods. For example, the above organopolysiloxane compositions can be poured into water and mixed uniformly by a colloid mill or homomixer. Thereafter, the resulting aqueous dispersions are dispersed in water at a temperature above 50° C. or sprayed into hot air for curing of the organopolysiloxane compositions. It is also possible to cure the organopolysiloxane compositions and mechanically pulverize the cured products.

The polishes of the present invention contain the film-forming materials and the organopolysiloxane elastomer particles described above. The polishes may also contain other additives commonly used in polishes, such as organic solvents, silicone oils, water, surfactants, abrasives, dyes, perfumes, leveling agents, and thickeners. These additives may be used alone or as mixtures. Organic solvents may be kerosene, naphtha, mineral spirits, and methylchloroform. Silicone oils may be dimethyl polysiloxane, methylphenyl polysiloxane, methylhydrogen polysiloxane, amino-modified alkylpolysiloxanes, cyclic dimethyl polysiloxanes, cyclic methylphenyl polysiloxanes, cyclic methylhydrogen polysiloxanes, and epoxy-modified alkyl polysiloxanes. The additives may be used in an amount of 3-250 wt % of the film forming materials. Surfactants are nonionic surfactants such as sorbitan fatty acid esters, glycerin fatty acid esters, decaglycerin fatty acid esters, polyglycerin fatty acid esters, propylene glycol, pentaerythritol- fatty acid esters, polyoxyethylene sorbitan fatty acid esters, polyoxyethylene glycerin fatty acid esters, polyethylene glycol fatty acid esters, polyoxyethylene alkyl ethers, polyoxyethylene phytosterol, phytosterol polyoxyethylene polyoxypropylene alkyl ether, polyoxyethylene castor oil, polyoxyethylene alkylamine fatty acid amide, polyoxytetramethylene polyglyceryl alkyl ether, alkyl fatty acid triglyceride, and polyoxyalkylene dimethyl polysiloxane copolymers; anionic surfactants such as polyoxyalkyl ether sulfate salts, N-acylamino acid salts, alkyl phosphate salts, polyoxyethylene alkyl ether phosphate salts, and fatty acid salts; cationic surfactants such as alkylammonium salts, and alkylbenzylammonium salts; amphoteric surfactants such as betaine acetate, imidazolium betaine, and lecithin.

The polishes of the present invention can be prepared by mixing the film-forming materials and organopolysiloxane elastomer particles uniformly with the additives.

The present invention is further explained by the following examples. In the examples, parts are by weight, and Me stands for the methyl group.

REFERENCE EXAMPLE 1

Preparation of organopolysiloxane elastomer particles (I)

A mixture was prepared from 100 parts of dimethyl polysiloxane terminated by hydroxy groups at both chain ends and having a viscosity of 4000 cSt, 0.9 parts of methyltrimethoxysilane, 1 part of polyoxyethylene alkyl ether (Emulgen 106, a product of Kao Co.), 100 parts of purified water, and 0.2 parts of stannous octoate. The mixture was passed through a colloid mill at a colloid gap of 0.8 mm, discharged into hot water at 60° C., allowed to stand for 5 hours, and spray-dried to provide the organopolysiloxane elastomer particles.

The organopolysiloxane elastomer particles thus obtained were spheres of an average particle diameter of 15 μm as observed by scanning electron micrographs. These particles also had rubbery elasticity.

REFERENCE EXAMPLE 2

Prepartation of organopolysiloxane elastomer particles (II)

A mixture was prepared from 100 parts of dimethyl polysiloxane terminated by dimethylvinylsiloxy groups at both ends represented by the formula

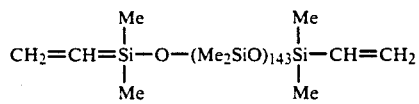

4.7 parts of linear methyl hydrogen polysiloxane containing branches represented by $(Me)_{15}(H)_7(SiO)_9$.

2.5 parts of polyoxyethylene alkyl ether-type nonionic surfactant (Tergitol ® TMN-6, a product of Union Carbide Co.), 100 parts of water, and a chloroplatinic acid solution in isopropanol to platinum content of 100 ppm based on the organopolysiloxane. This mixture was poured into a colliod mill to obtain an aqueous dispersion of the organopolysiloxane composition. The dispersion was allowed to flow into a hot water bath at 60° C. to cure the organopolysiloxane composition to obtain organopolysiloxane elastomer particles. Observation of the organopolysiloxane elastomer particles under scanning electron microscope showed spherical particles with an average diameter of 10 μm. The particles had rubbery elasticity.

APPLICATION EXAMPLE 1

In a container equipped with a stirrer was placed 10 parts of carnauba wax, 10 parts of ozoride, 20 parts of beeswax, and 10 parts of microcrystalline wax, and the mixture was melted at 90° C., and mixed further with 25 parts of liquid paraffin and 10 parts of dimethyl polysiloxane oil having a viscosity of 350 cSt. This was further mixed with magnesium silicate and the organopolysiloxane elastomer particles prepared in Reference Example 1. While being mixed, the mixture was cooled to 50° C.; mixing was stopped, and the mixture was allowed to cool naturally to obtain a solid polish. This polish was applied to a coated metal surface and evaluated for coatability, wipe workability, and appearance. Results are set forth in Table I. Evaluation was performed by a 3-member panel.

For comparison, a polish was prepared without the organopolysiloxane elastomer particles, and evaluated. The results are also set forth in Table I.

TABLE I

| EXAMPLE | ITEMS | EVALUATOR 1 | 2 | 3 |
|---|---|---|---|---|
| Application | Coatability | Easy | Easy | Easy |
| Application | Wipe Workability | Realitively Easy | Easy | Easy |
| Application | Appearance | No Uneveness | No Uneveness | No Uneveness |
| Comparative | Coatability | Difficult | Somewhat Difficult | Somewhat Difficult |
| Comparative | Wipe Workability | Difficult | Catchy | Difficult |
| Comparative | Appearance | Totally | Uneven | Totally |

TABLE I-continued

| EXAMPLE | ITEMS | EVALUATOR 1 | 2 | 3 |
|---|---|---|---|---|
| tive | | | Uneven | Uneven |

APPLICATION EXAMPLE 2

In a container equipped with a stirrer was heated and mixed 20 parts of carnauba wax (a product of Nippon Chemical Co.), 40 parts of kerosine, and 20 parts of dimethyl polysiloxane oil. After the carnauba wax was melted, 10 parts of organopolysiloxane elastomer particles obtained in Reference Example 2 was added, and the mixture was allowed to cool to room temperature while being stirred to obtain a creamy polish. This polish was coated on the surface of a crepe synthetic black leather and the wipe workability, gloss, and gloss retention were evaluated. The results are set forth in Table II.

For comparison, a polish was prepared as above without the organopolysiloxane elastomer particles (Comparative Example 1), and a polish was prepared using polyethylene powder of an average diameter of 10 μm instead of the organopolysiloxane elastomer particles (Comparative Example 2). Evaluations were made and the results are set forth in Table II.

TABLE II

| EXAMPLE | WIPE WORKABILITY | SOIL CLEANING | GLOSS AS COATED | AFTER 7 DAYS |
|---|---|---|---|---|
| Application | Easy Even | Even until in crepe | Uniform* | Good No change |
| Comparative 1 | Easy Even | Even in crepe | Relatively uniform** | Poor No gloss |
| Comparative 2 | Difficult Uneven | Totally uneven | Relatively uniform*** | Poor No gloss |

That which is claimed is:

1. A polish comprising a film forming wax material and an organopolysiloxane elastomer, the elastomer being in the form of particles mixed with the film forming wax.

2. The polish of claim 1 in which the particles have an average diameter of from about 0.1 μm to about 1,000 μm.

3. The polish of claim 2 in which the particles have an average diameter of from about 0.3 μm to about 30 μm.

4. The polish of claim 3 in which the particles are spherical.

5. The polish of claim 2 in which the particles constitute about 0.1 to about 50 percent by weight of the polish.

6. The polish of claim 5 including at least one additive selected from the group consisting of organic solvents, silicone oils, and surfactants.

7. The polish of claim 6 in which the additive constitutes from about 3.0 to about 250.0 percent by weight based on the weight of the wax.

8. The polish of claim 6 wherein the film forming wax material is selected from the group consisting of carnauba wax, montan wax, candelilla wax, ceresin wax, paraffin waxes, and beeswax.

9. The polish of claim 2 in which the elastomer forming the particles is obtained by curing an organopolysiloxane selected from the group consisting of organopolysiloxanes containing silicon bonded hydrogen, organopolysiloxanes containing silicon bonded vinyl groups, and organopolysiloxanes containing hydroxy groups at both ends.

* * * * *